US008628123B2

(12) United States Patent
Visenzi

(10) Patent No.: US 8,628,123 B2
(45) Date of Patent: Jan. 14, 2014

(54) CASE FOR MOTOR VEHICLES WITH FACILITATED OPENING DEVICE

(75) Inventor: Giuseppe Visenzi, Brescia (IT)

(73) Assignee: Givi S.R.L., Flero (Brescia) (IT)

(*) Notice: Subject to any disclaimer, the term of this patent is extended or adjusted under 35 U.S.C. 154(b) by 604 days.

(21) Appl. No.: 12/735,702

(22) PCT Filed: Dec. 11, 2008

(86) PCT No.: PCT/IB2008/003472
§ 371 (c)(1), (2), (4) Date: Oct. 21, 2010

(87) PCT Pub. No.: WO2009/101470
PCT Pub. Date: Aug. 20, 2009

(65) Prior Publication Data
US 2011/0037277 A1 Feb. 17, 2011

(30) Foreign Application Priority Data
Feb. 11, 2008 (IT) .............................. MI2008A0211

(51) Int. Cl.
*E05C 5/04* (2006.01)

(52) U.S. Cl.
USPC ....... 292/58; 292/216; 292/201; 292/DIG. 12

(58) Field of Classification Search
USPC .............. 292/58, 216, 201, DIG. 12, DIG. 11
See application file for complete search history.

(56) References Cited

U.S. PATENT DOCUMENTS

| | | | | |
|---|---|---|---|---|
| 4,413,849 | A * | 11/1983 | Davis et al. | 292/229 |
| 4,813,722 | A * | 3/1989 | Viscome et al. | 292/216 |
| 5,308,126 | A * | 5/1994 | Weger et al. | 292/53 |
| 7,226,129 | B2 * | 6/2007 | Brandes et al. | 297/378.13 |
| 8,191,935 | B2 * | 6/2012 | Toppani et al. | 292/32 |
| 2001/0030439 | A1 | 10/2001 | Sumada | |
| 2003/0183669 | A1 | 10/2003 | Cameron | |
| 2004/0140678 | A1 | 7/2004 | Linares | |
| 2004/0239125 | A1 | 12/2004 | Chen | |
| 2006/0220406 | A1 | 10/2006 | Misaki | |

FOREIGN PATENT DOCUMENTS

| | | |
|---|---|---|
| DE | 42 30 972 | 5/1993 |
| EP | 1 069 035 | 1/2001 |
| WO | 2007/131941 | 11/2007 |

* cited by examiner

*Primary Examiner* — Carlos Lugo
*Assistant Examiner* — Mark Williams
(74) *Attorney, Agent, or Firm* — Jacobson Holman PLLC

(57) ABSTRACT

A case for motor vehicles is equipped for removably fastening to a support plate on the motor vehicle and includes a base part and a cover hinged together and equipped with a locking mechanism for holding the cover in position and that preferably also includes a lock able to be controlled to prevent a control to open the cover. The locking mechanism allows partial shifting the cover from the base part that acts positively on the closed cover when the locking mechanism passes from the holding position to the release position.

14 Claims, 5 Drawing Sheets

12
19
19
20
20
14
15
16

CASE FOR MOTOR VEHICLES WITH FACILITATED OPENING DEVICE

This is a national stage of PCT/IB08/003472 filed Dec. 11, 2008 and published in English, which has a priority of Italian no. MI2008A000211 filed Feb. 11, 2008, hereby incorporated by reference.

FIELD OF THE INVENTION

The present invention refers to a case of the type suitable for removably coupling on a support plate mounted on a motor vehicle.

BACKGROUND OF THE INVENTION

In the field many bags are known provided with means for removable engagement on suitable fastening plates mounted on the motor vehicle. Often, such bags comprise a sliding bolt element that snaps onto or into a suitable projection in the plate to stably fix the case to the plate. A button mechanism, possibly equipped with a lock, allows the bolt to be withdrawn to unlock the case.

SUMMARY OF THE INVENTION

The general purpose of the present invention is to provide a case equipped with a robust opening/closing mechanism that also provides advantageous characteristics of easier opening. In particular, a purpose of the invention is also to provide a mechanism that allows a pre-opening movement of the cover to ensure that the user can easily open the cover of the case.

Advantageously, according to a variant embodiment the system also allows the cover to be easily opened through the use of an electromagnetic actuator. In such a case, it is possible to make a case equipped with a remote control opening system.

According to the principles of the present invention, the closing system, by using the same key, can also manage the possibility of hooking/unhooking the case from the support fixed to the motorcycle.

In view of the purposes of the invention it has been thought of to make, according to the invention, a case for motor vehicles, equipped with means for removably fastening to a support plate on the motor vehicle, comprising a base part and a cover hinged together and equipped with a locking mechanism able to be controlled with control means from a first position holding the cover in closed position to a second position releasing the cover to allow it to be opened, preferably also comprising a lock that can be controlled to prevent a control to open the cover, characterized in that it comprises means for partially shifting the cover from the base part that act positively on the closed cover at the passage of the locking mechanism from the holding position to the release position.

BRIEF DESCRIPTION OF THE DRAWINGS

In order to clarify the explanation of the innovative principles of the present invention and its advantages compared to the prior art hereafter we shall, with the help of the attached drawings, describe a possible example embodiment applying such a principle. In the drawings.

DETAILED DESCRIPTION OF THE PREFERRED EMBODIMENTS

Figure 1:
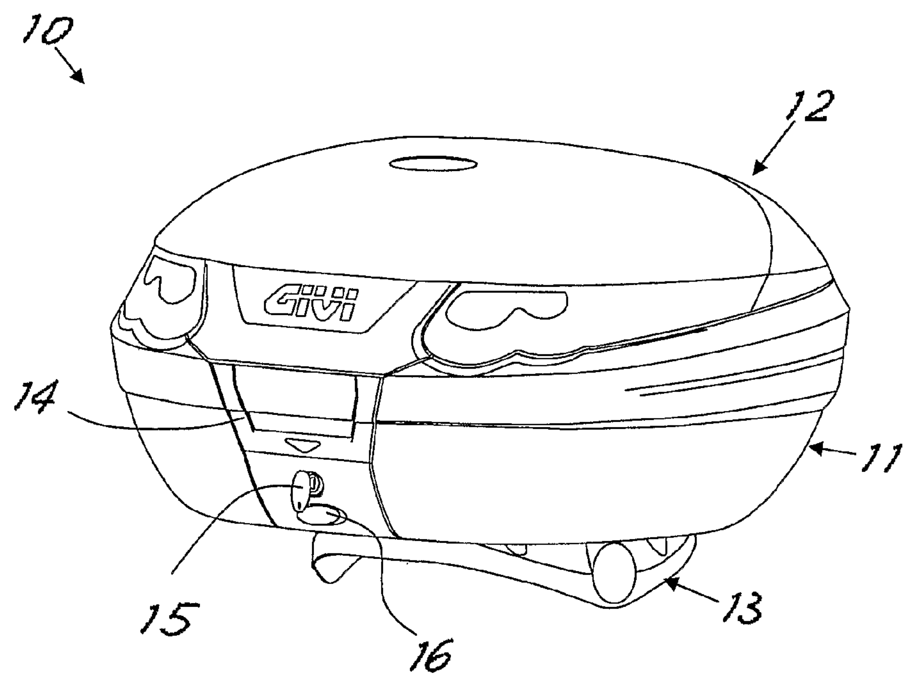
FIG. 1 represents a schematic perspective view of a case according to the invention, coupled with the plate for fastening to the motorcycle.

With reference to the figures, FIG. 1 shows a case, generically indicated with 10, suitable for coupling with motor vehicles and made according to the principles of the present invention.

By case we mean any suitable type of container equipped with a body and a cover hinged together. The type shown is generally known as a topcase, formed from a bottom shell 11 that makes the body of the case and a top shell 12 that makes the cover and hinged at the back to the bottom shell.

The case is equipped at the bottom with a rigid base on which there are conventional means for removably attaching to a plate 13 fixed to the motor vehicle. The plate and the fastening means are per se known and easily conceived by the man skilled in the art. Therefore, they shall not be described or shown in detail here. As shall become clear hereafter the attachment means generically comprise passive couplings, for example using a clasp, and a latch locking system, able to be actuated to allow a disengagement movement of the case from the passive couplings and allow the case to be removed from the plate.

The case is equipped with a handle 14, which advantageously also makes thrusting means to actuate the opening of the cover, a key lock 15 and a button to release the case from the plate. Advantageously, the lock itself 15 can manage both the opening of the cover and the release button.

Between cover and base there is a locking mechanism able to be controlled with suitable control means to move it from a first position holding the cover in closed position to a second position releasing the cover to allow it to be opened.

Figure 2:
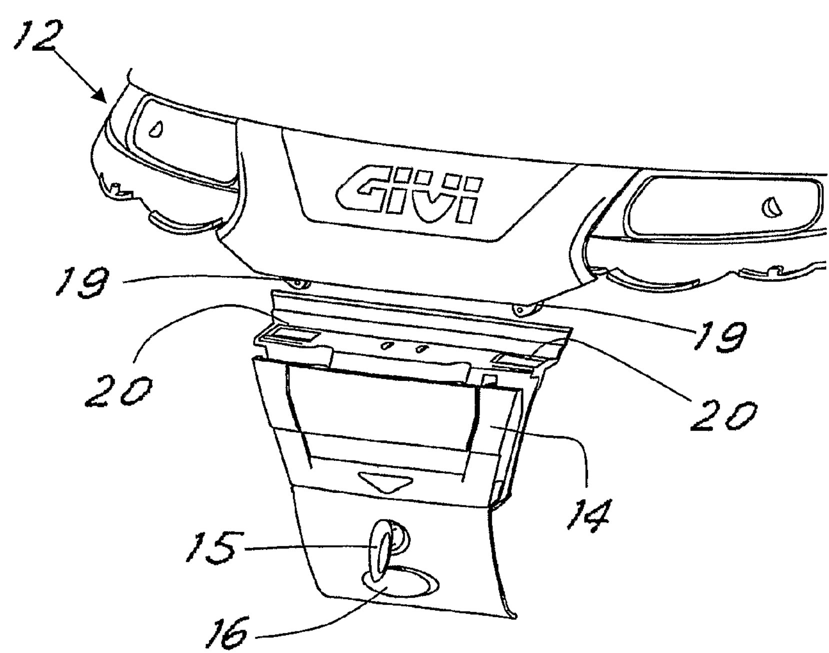
FIG. 2 represents a partial schematic view of the case of FIG. 1 that shows the cover of the case in partially raised position.

FIG. 2 shows a detail of the area of the lock, with the cover slightly open. In such a figure on the cover 12 it is possible to see a pair of hooks 19 that insert into suitable passages 20 on the edge of the bottom shell of the case to be suitably engaged by the locking mechanism.

Figure 3:
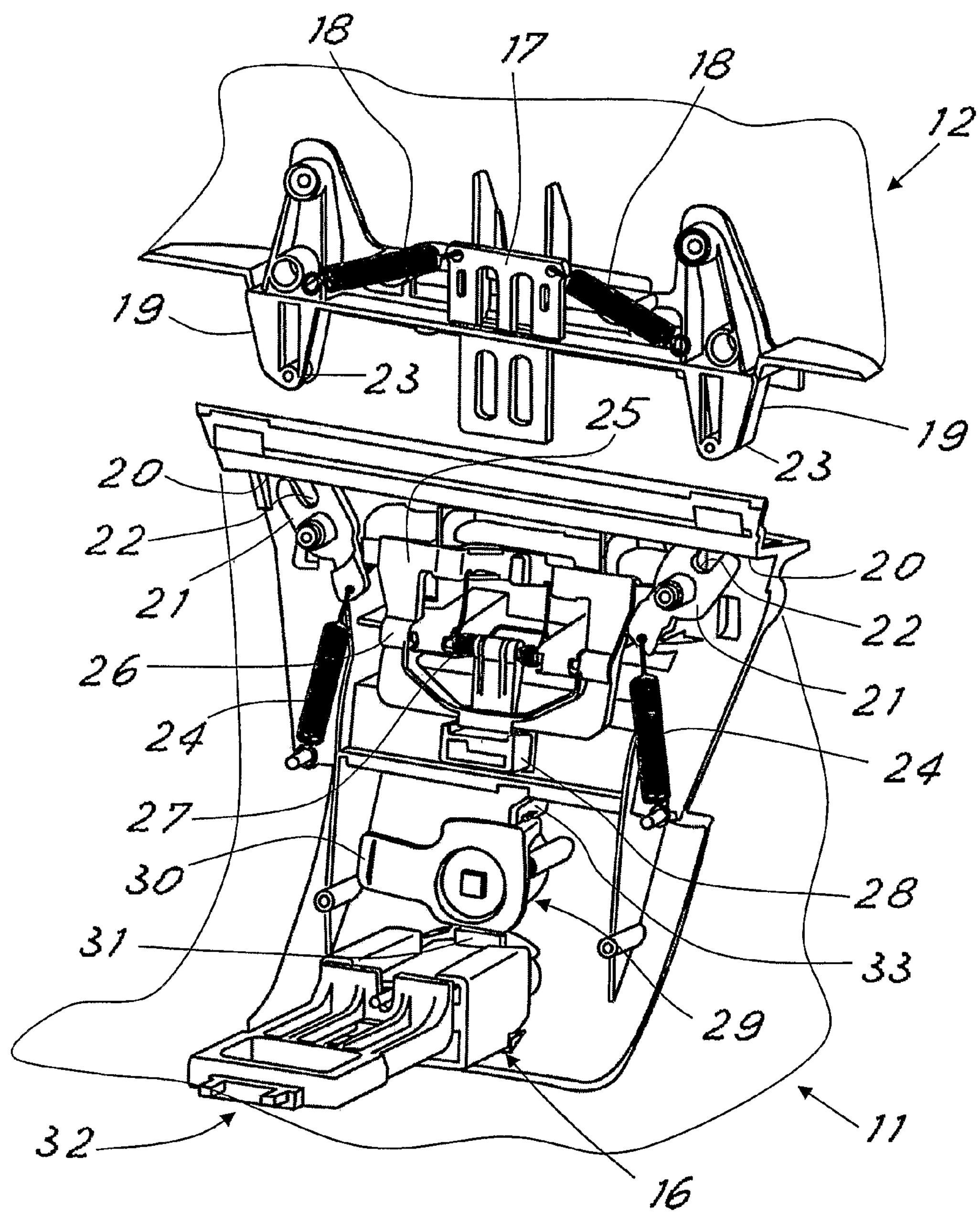
FIG. 3 represents a partial schematic view from the inside of the lock mechanism of the case in open condition.

In FIG. 3 such a closing mechanism is shown, from the inside of the case, together with the part of the mechanism present in the cover and equipped with hooks 19. In the figures possible protections that make the inside of the case and that protect the mechanisms have been removed.

The locking mechanism comprises means 21 for partially shifting the cover from the base part that act positively on the closed cover at the passage of the locking mechanism from the holding position to the release position.

In the described embodiment, the shifting means comprise one or two rotation levers (or rotating forks) 21 oppositely inclined upwards and with open slots 22 that are intended, when the cover is closed, to each receive the bottom end of a respective hook 19 (shaped with a suitable horizontal pin 23).

Figure 4:
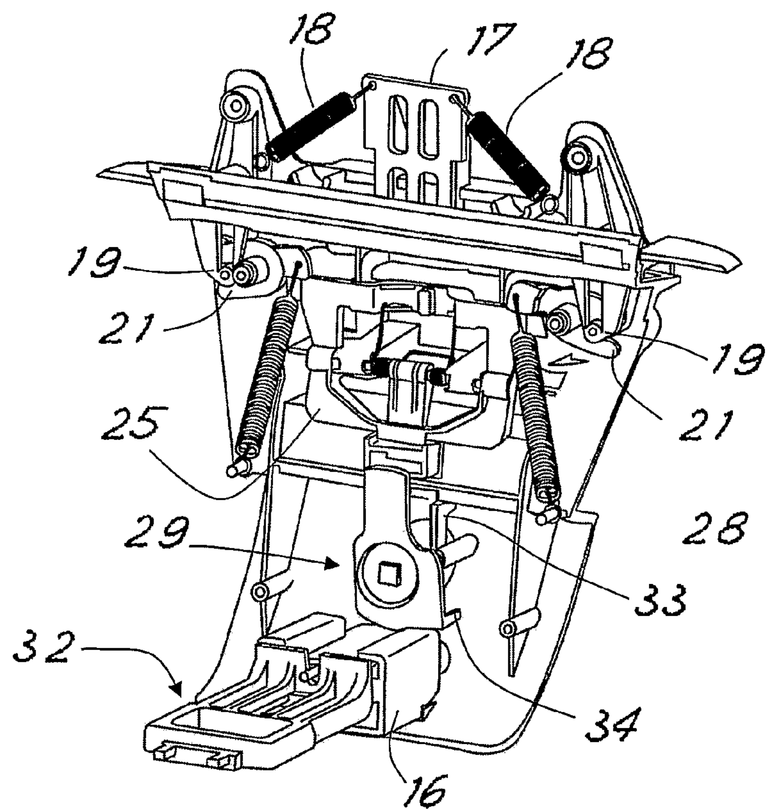
FIG. 4 represents a schematic view similar to the one of FIG. 3, but with the mechanism in closed condition.

As can be seen in FIG. 4, when the cover is closed the hooks 19 rotate the levers 21 in a mirroring fashion, against the action of springs 24, to push them towards a horizontal locking position.

From the comparison of FIGS. 3 and 4 it is clear how such a rotation of the levers 21 is then maintained by a stop element 25 that allows the movement of the levers towards the release position to be locked or unlocked. Advantageously, the stop element is made with a rocker arm element 25 that rotates around a horizontal hinging axis 26, thanks to the action of a spring 27, to lock the return of the levers 21 towards the release position of FIG. 3.

To unlock the levers 21 and to open the cover there are control means that advantageously comprise a presser element 28, pivoted at the same axis 26 as the rocker arm and that rests on the lower arm of the rocker arm to rotate it towards the position not interfering with the levers 21 when it is pushed towards the inside of the case (advantageously through a suitable push on the handle, as shall become clear hereafter).

Advantageously, there are spring means 17, 18 for pushing between cover and base part to increase the shift of the cover once unlocked. In particular, in the advantageous embodiment shown the cover is equipped with a slider 17 that is pushed to elastically project from the edge of the cover by means of springs 18, so as to react against the corresponding edge of the bottom shell of the case. This makes it easier to move the cover open.

Again from the comparison of FIGS. 3 and 4 it can be seen how the lock at the back actuates a rotary bolt 29 that has a radial projection 30 that, with the lock in closed position (FIG. 4), goes into vertical position and prevents the possibility of the presser moving towards the rocker arm and unlocking the levers.

The button 16 controls the sliding of a slider or sliding bolt 32 that in rest position holds the case on the plate, as shall be made clear hereafter. In the closed position of the lock the rotary bolt 29 also interferes with a projection 31 present on the back of the button 16, so as to prevent it from moving and, consequently, to prevent the case from releasing from the plate by pressing on the button 16.

Figure 5:
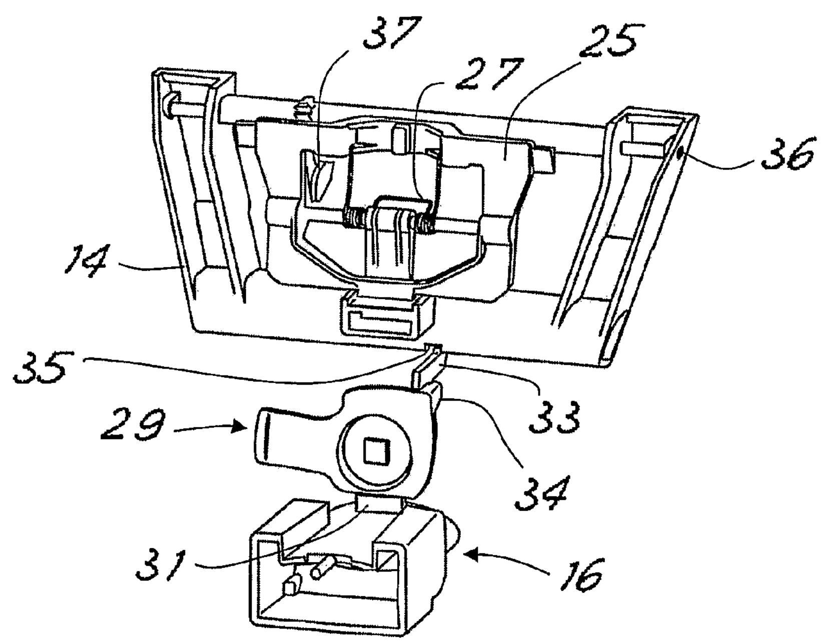
FIG. 5 represents a partial detail of the release system of a handle of the case.

Advantageously, the handle 14 for lifting the case can be rotated between a rest position, arranged built flush into the wall of the case, and an operative position only after the release of a suitable stop 33 that, when the lock is in unlocked position, is pushed to elastically bend by means of a projection 34 of the bolt 29. FIG. 5 schematically shows the action of the projection 34 on the stop 33 to take the end of the stop to a release passage 35 located inside the handle 14, so that the handle can rotate around a pivot 36 thereof thanks to the action of suitable spring means (not shown) and go into operative position withdrawn from the case. A known viscous retarder 37 is advantageously present to brake the movement given by the springs and to make the movement of the handle better. From FIG. 5 it is also clear how the handle rests on the presser 28 to actuate it. Advantageously, the release of the handle takes place by rotating the key by an angle slightly greater than its stable open position.

Figure 6:
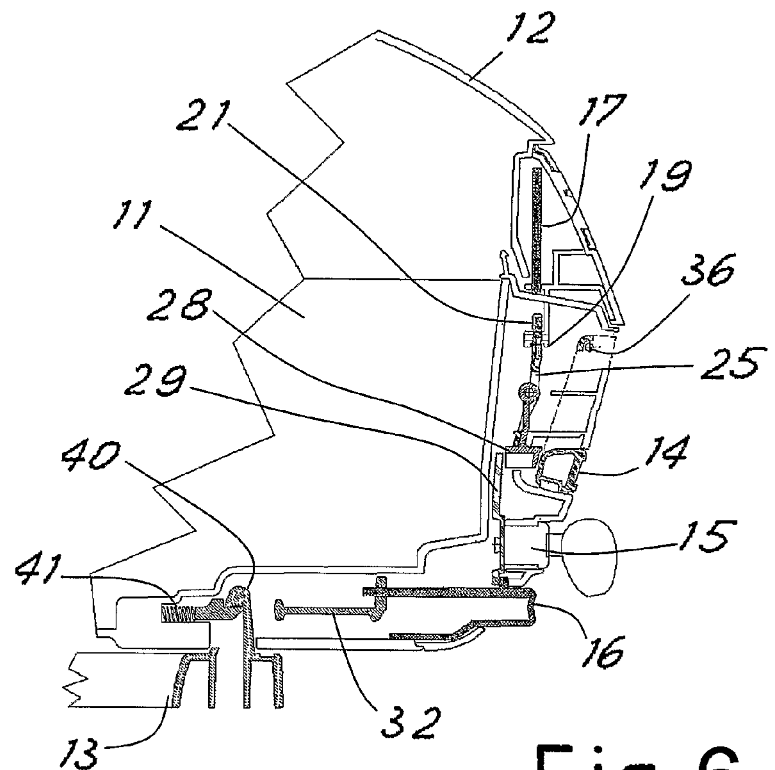
FIGS. 6 and 7 represent partial and section schematic views of the case of FIG. 1, with the mechanism in closed and half-open condition, respectively.
Figure 7:
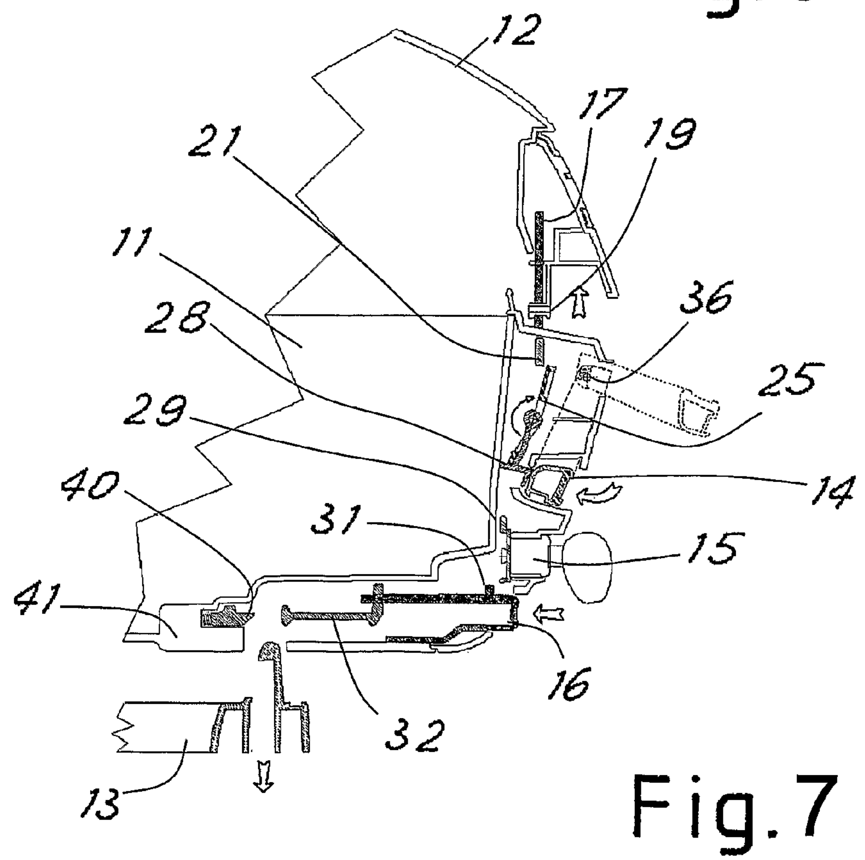

The schematic sections shown in FIGS. 6 and 7 further clarify the operation of the mechanism made according to the principles of the invention.

In FIG. 6 the case is in closed condition attached to the support. The support is equipped with passive engagement means at the back of the case (not shown) and with a clasp 40 that engages in the slider 32 pushed by a spring 41. The handle is in rest position, built flush into the wall of the case.

In the condition with the lock closed, the rotary bolt 29 has the projection 30 locking the presser 28. Moreover, the button 16 cannot be pressed to release the topcase from the support due to the locking of the projection 31. Advantageously, the slider 32 is suitably slidably connected to the button 16 to in any case allow the case to be attached even with the lock closed and the button locked.

In order to open the topcase it is necessary to turn the key (by 85° in the solution shown) towards the open position of FIG. 3 to allow the rotation of the rocker arm and presser group in this way.

As shown in FIG. 7, it is thus necessary to press in the central area of the handle and in this way the handle rotates towards the inside of the topcase and impacting with the presser 28 causes it to rotate. The rotating of the presser causes the same rotation of the rocker arm 25 that, in turn rotating towards the outside in its top part, frees the rotation levers 21 that, under the action of the springs 24 rotate and go from the horizontal position to the vertical position.

Going into vertical position, the levers force the hooks 23, and consequently the cover fixedly connected to it, to move vertically and thus to open the case.

In this way a first vertical movement of the cover is generated (equal to about 15 mm in the solution shown). The extent of such movement is determined by the shape of the rotation levers.

In order to make it easier for the cover to open, the slider 17 also intervenes, pushing on the edge of the case and increasing the space between base and cover. At the moment when the cover starts to open, the slider, thanks to the action of the springs 18, cam slide downwards coming out from the cover and, acting upon the horizontal plane of the hinge, pushes the cover further upwards increasing the gap between cover and base (about 30 mm in the embodiment shown) to double the value of that generated by just the action of the rotation levers.

If so desired, the gap between base and cover can be increased or decreased by acting upon the size of the levers and of the slider.

With opening complete, removing the pressure from the handle, the presser, the rocker arm and the handle return automatically into the starting position (the same one that they occupy when the hinge is closed), thanks to the action of the spring 27.

It is also possible to open the topcase by making the handle come out from its seat (turning the key by 90° to unlock it) and then by pressing directly upon the presser, advantageously configured like a press key. The withdrawn operative position of the handle is shown with a broken line in FIG. 7.

In order to close the case it is sufficient to press the cover towards the closed position without needing to act upon any type of linkage. Indeed, by pushing the cover downwards, the bottoms ends of the hooks 19 engage the slots of the rotation levers 21 and force them to rotate downwards.

In this rotation movement the rotation levers, thanks to suitable inclined planes, make the rocker arm and presser group rotate until they go back into the closed position.

The closing of the case, given the type of mechanism described, can take place without distinction either with the key in closed or open position.

In the open lock position (FIG. 7) it is possible to press on the press-key 16 to release the case from the support plate.

Figure 8:
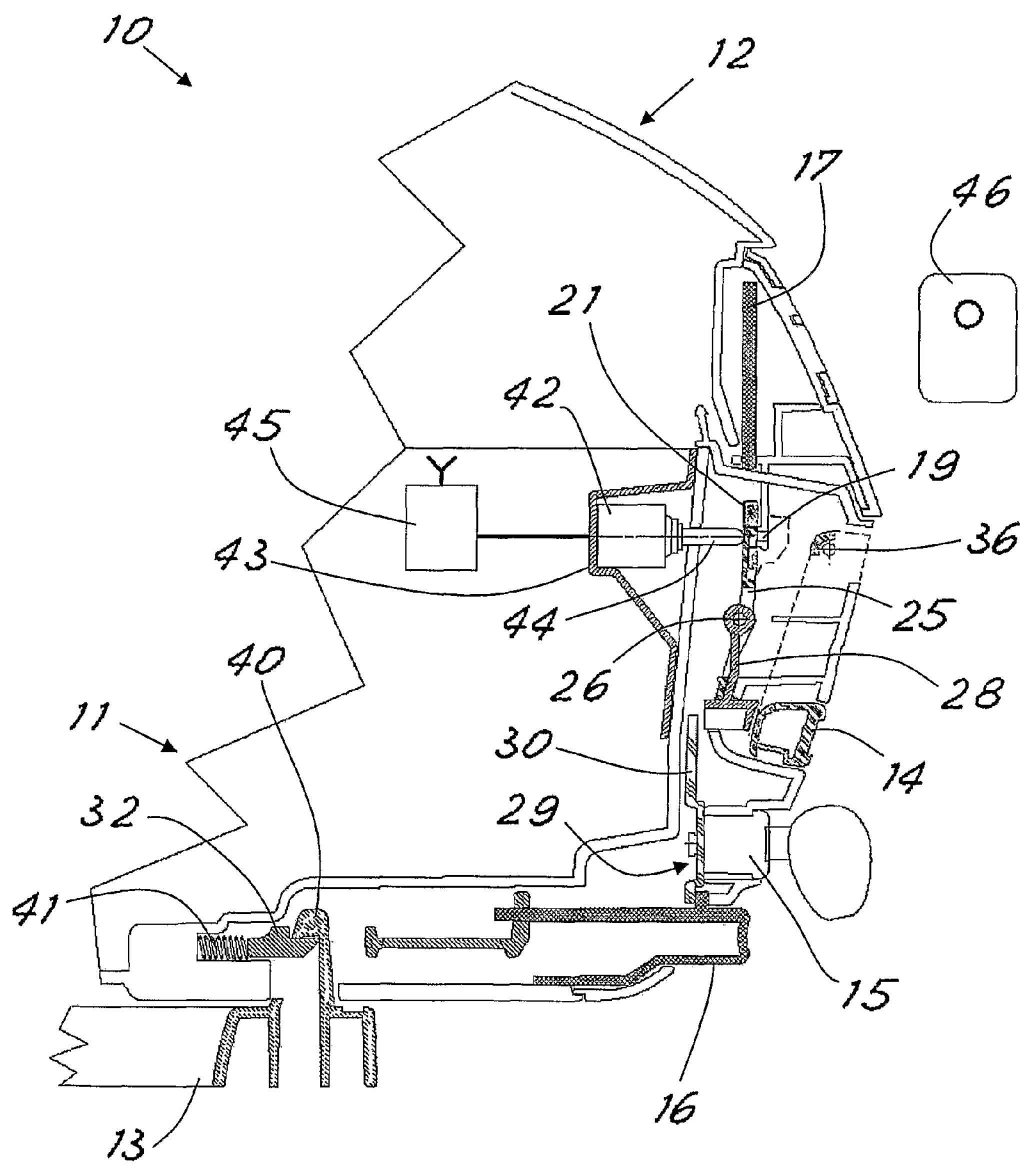
FIG. 8 is a schematic view similar to the one of FIG. 6, but of a variant of the mechanism with electromagnetic actuator and remote control.

FIG. 8 shows a variant embodiment of the case where an electromagnetic actuator 42 has simply been added, housed in a suitable seat 43 inside the base of the case. The actuator is equipped with a mobile horizontal shaft 44 that, receiving an electrical control impulse, pushes against the top part of the rocker arm 25 that rotates (in this case independently from the presser 28) and, as already described above, frees the rotation levers 21 that, going into vertical position, lift the cover.

When the forward stroke is complete the stem of the actuator automatically returns into the initial position. Consequently, once opening has occurred, the rocker arm thanks to the action of the spring 27 goes back into the original position and sets itself for the closing of the cover that will occur afterwards.

The opening with the actuator is totally independent from the key and, therefore, given the type of mechanism, it can take place both with the key in closed position or in open position and, for the same reason, the cover can be closed in the two configurations. For security reasons, the release of the case from the plate, on the other hand, is always managed by the key.

The actuator can without distinction be powered by batteries or by the 12 V current taken directly from the battery through a suitable connection system.

The electrical opening impulse can be provided in various ways.

Advantageously, it has been thought of to equip the case with a remote control system, comprising a receiver 45 and a transmitter 46. A known radio or infrared remote control system can be used.

It should be noted that the full functionality of the key is maintained in parallel so as to freely intervene even in the case of malfunction or failure of the electronic part.

At this point, it is clear how all of the predetermined purposes have been accomplished, providing a case with a strong and reliable opening mechanism that allows easier opening of the case for motor vehicles.

Of course, the description made above of an embodiment applying the innovative principles of the present invention is given as an example of such innovative principles and therefore must not be taken to limit the scope of protection claimed here. For example, the locking mechanism can comprise a single forked lever 21 and a single hook 19, even if it has been found preferable to use two hooks and two levers, with the spring thrusting element 17 between them, for better closing. Other locking means can be considered, with independent partial shifting spring mechanisms.

The invention claimed is:

1. A case for motor vehicles, the case being equipped with means for removably fastening the case to a support plate on the motor vehicle, said case comprising a base part and a cover hinged together and the base part and the cover being equipped with a locking mechanism able to be controlled by control means between a first position of the locking mechanism, holding the cover in a closed position, to a second position of the locking mechanism, releasing the cover to allow the cover to be opened, and the locking mechanism including means for partially shifting the cover from the base part by acting directly on the closed cover by the movement of the locking mechanism from the first position to the second position.

2. The case according to claim 1, wherein the locking mechanism includes at least one rotation lever, the at least one rotation lever is equipped with an open slot and the locking mechanism is able to be rotated upon command between a position holding a respective hook fixedly connected to the cover and a position releasing the hook, and in the movement from the holding position to the release position the rotation lever pushing the hook to shift the cover from the base part.

3. The case according to claim 2, wherein the rotation lever rotates towards the release position upon action of a respective spring, a stop element is mobile by the control means, between an engagement position and a disengagement position of the rotation lever in the holding position to allow spring movement of the rotation lever towards the release position.

4. The case according to claim 3, wherein there are two rotation levers, rotating in a mirroring fashion towards the release position.

5. The case according to claim 1, wherein the control means include manual means controlled by pressing.

6. The case according to claim 5, wherein the manual means controlled by pressing is actuated by pushing on a handle for lifting the case when received in a rest position in the base part.

7. The case according to claim 6, wherein when in the rest position the handle is received in a flush seat in a wall of the base part.

8. The case according to claim 5, further comprising a lock able to be controlled to prevent the cover from being controlled to open and the lock is actuated to prevent action of the manual means controlled by pressing.

9. The case according to claim 6, further comprising a lock able to be controlled to prevent the cover from being controlled to open and the lock rotates by key between a first stable position for preventing the action of the manual means controlled by pressing and a second stable position that allows the action of the manual means controlled by pressing, and means for holding the handle in the rest position is capable of being unlocked through a rotation of the lock beyond said second stable position.

10. The case according to claim 1, further comprising a lock able to be controlled to prevent the cover from being, controlled to open and the lock in a condition preventing the cover from being controlled to open also prevents unhooking movement of a mechanism for holding the case on the support plate.

11. The case according to claim 1, further comprising spring means for pushing between the cover and the base part in a direction to increase shift between the cover and the base part when the locking mechanism passes from the first position to the second position.

12. The case according to claim 3, further comprising an electric actuator that upon command acts upon the stop element to move the stop element towards the disengagement position of the rotation lever.

13. The case according to claim 12, wherein the actuator is controlled through a remote control system.

14. A case for motor vehicles, the case being equipped with means for removably fastening the case to a support plate on the motor vehicle, the case comprising a base part and a cover hinged together and the base part and the cover being equipped with a locking mechanism able to be controlled by control means between a first position of the locking mechanism, holding the cover in a closed position, to a second position of the locking mechanism, releasing the cover to allow the cover to be opened, the locking mechanism including means for partially shifting the cover from the base part by acting directly on the closed cover when the locking mechanism passes from the first position to the second position, and spring means for a pushing action between the cover and the base part, directed to increase a shift between the cover and the base part when the locking mechanism passes from the first position to the second position.

* * * * *

UNITED STATES PATENT AND TRADEMARK OFFICE

CERTIFICATE OF CORRECTION

PATENT NO. : 8,628,123 B2
APPLICATION NO. : 12/735702
DATED : January 14, 2014
INVENTOR(S) : Giuseppe Visenzi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 675 days.

Signed and Sealed this
Twenty-second Day of September, 2015

Michelle K. Lee
*Director of the United States Patent and Trademark Office*